United States Patent
Ichihara et al.

(10) Patent No.: US 10,427,783 B2
(45) Date of Patent: Oct. 1, 2019

(54) MULTICOPTER

(71) Applicant: PRODRONE CO., LTD., Nagoya-shi, Aichi (JP)

(72) Inventors: Kazuo Ichihara, Nagoya (JP); Kiyokazu Sugaki, Nagoya (JP)

(73) Assignee: PRODRONE CO., LTD., Nagoya-shi (JP)

( * ) Notice: Subject to any disclaimer, the term of this patent is extended or adjusted under 35 U.S.C. 154(b) by 277 days.

(21) Appl. No.: 15/552,364

(22) PCT Filed: Feb. 25, 2016

(86) PCT No.: PCT/JP2016/055539
§ 371 (c)(1),
(2) Date: Aug. 21, 2017

(87) PCT Pub. No.: WO2016/136848
PCT Pub. Date: Sep. 1, 2016

(65) Prior Publication Data
US 2018/0037317 A1    Feb. 8, 2018

(30) Foreign Application Priority Data
Feb. 25, 2015   (JP) ................... 2015-035942

(51) Int. Cl.
*B64C 27/20* (2006.01)
*B64C 27/08* (2006.01)
(Continued)

(52) U.S. Cl.
CPC ............. *B64C 27/20* (2013.01); *B64C 27/08* (2013.01); *B64C 27/28* (2013.01); *B64C 29/00* (2013.01);
(Continued)

(58) Field of Classification Search
CPC ......... B64C 27/08; B64C 27/20; B64C 27/28; B64C 29/00; B64C 29/016; B64C 29/0033; B64C 2201/027; B64C 2201/162
See application file for complete search history.

(56) References Cited

U.S. PATENT DOCUMENTS 3,061,242 A    10/1962   Zurawinski et al.
3,488,018 A *   1/1970   Johnson .............. B64C 29/0033
                                                     244/12.4
(Continued)

FOREIGN PATENT DOCUMENTS

CN        102358420 A    2/2012
JP        H10-035592 A   2/1998
(Continued)

OTHER PUBLICATIONS

May 17, 2016 International Search Report issued in Patent Application No. PCT/JP2016/055539.

*Primary Examiner* — Richard G Davis
(74) *Attorney, Agent, or Firm* — Oliff PLC

(57) ABSTRACT

To provide a multicopter that enables it to prevent generation of a vortex ring state of a rotor and control lift and thrust efficiently and elaborately. This is solved by a multicopter having a plurality of rotors installed radially to a frame, wherein at least one of the plurality of rotors is provided with a cylindrical duct surrounding and enclosing the rotor; and the duct is formed in a shape making an air flow from an air intake side to an air outlet side of the rotor imbalanced in a circumferential direction of the duct.

11 Claims, 16 Drawing Sheets

(51) Int. Cl.
*B64C 27/28* (2006.01)
*B64C 29/00* (2006.01)
*B64C 39/02* (2006.01)

(52) U.S. Cl.
CPC ...... *B64C 39/024* (2013.01); *B64C 2201/027* (2013.01); *B64C 2201/108* (2013.01); *B64C 2201/162* (2013.01)

(56) References Cited

U.S. PATENT DOCUMENTS

| | | | | |
|---|---|---|---|---|
| 2002/0104923 | A1* | 8/2002 | Warsop | B64C 39/062 244/34 A |
| 2004/0026563 | A1* | 2/2004 | Moller | B64C 3/56 244/12.4 |
| 2006/0226281 | A1* | 10/2006 | Walton | B64C 27/20 244/17.23 |
| 2006/0231675 | A1* | 10/2006 | Bostan | B64C 3/385 244/12.1 |
| 2015/0197337 | A1 | 7/2015 | Tsunekawa et al. | |

FOREIGN PATENT DOCUMENTS

| | | |
|---|---|---|
| JP | 2003-175897 A | 6/2003 |
| JP | 2004-503430 A | 2/2004 |
| JP | 2006-021733 A | 1/2006 |
| JP | 2006-528583 A | 12/2006 |
| JP | 2011-126517 A | 6/2011 |
| WO | 2012/102698 A1 | 8/2012 |
| WO | 2014/062097 A1 | 4/2014 |
| WO | 2014/119155 A1 | 8/2014 |

\* cited by examiner

MULTICOPTER

TECHNICAL FIELD

The present invention relates to an unmanned aerial vehicle (multicopter) equipped with a plurality of rotors.

BACKGROUND ART

A multicopter is one type of helicopter in which a plurality of rotors are installed radially and a machine flying, while keeping balance by controlling the rotating speed of each of these rotors. Unlike a helicopter having a main rotor and a tail rotor, a multicopter does not need to have a complex mechanism of its rotors themselves, and therefore, the multicopter is very easy to maintain and it can be built at lower cost.

For airframe mounted components, which are comprised in a multicopter such as an acceleration sensor and an angular velocity sensor, recently, their performance has been enhanced and their price has decreased; and multicopter maneuverability has improved dramatically because many operations to control and manipulate the multicopter airframe have been automated. Against this background, especially regarding miniature multicopters, attempts are now made to apply to diverse missions in a wide range of fields, not only for hobby purposes. Multicopters equipped with three, four, six, and eight rotors are becoming popular and multicopter airframes specialized for particular purposes are becoming available such as ones for moving at high speed and ones dedicated to carrying heavy objects.

CITATION LIST

Patent Literature

PTL1: JP H10-35592 A
PTL2: JP 2003-175897 A

SUMMARY OF INVENTION

Technical Problem

As the power source of a miniature multicopter which is an unmanned aerial vehicle, a battery is becoming the mainstream. For multicopters, saving power consumption is an important element because it has an effect on duration of flight and a cruising distance.

Additionally, it is an important challenge to prevent a vortex ring state which is unique to rotorcrafts This phenomenon is as follows: when air speed has dropped to zero, e.g., when a multicopter is moving down rapidly, a vortex flow takes place locally around the tip of a rotor, which results in loss of lift.

In comparison with a helicopter which is equipped with one large rotor (main rotor), a multicopter has a high wing load and a propeller is formed as a structure in which lift can be generated in a center portion, and therefore, a vortex ring state is relatively unlikely to occur in a multicopter. However, once a vortex ring state occurs, recovery is difficult and it may cause a multicopter to crash.

In addition, a mechanism which is called a tilt rotor is publicly known as a mechanism in which one rotor is provided with both a function of taking off and landing vertically and a function of moving at high speed during cruising. In the case of the tilt rotor, a switchover between these functions is per formed by tilting the rotor. As a tilt rotorcraft, V-22 (Osprey), which was jointly developed by Bell Helicopter Co., Ltd. and Boeing Rotorcraft Systems, is already put in practical use. However, a problem posed is that controlling a tilt rotorcraft is very difficult and advanced control by combination of complex sensors is required.

The present invention is intended to provide a multicopter in which rotors can be prevented from going into a vortex ring state, and lift and thrust generated by the rotors can be controlled efficiently and elaborately.

Solution to Problem

To solve the foregoing problem, a multicopter of the present invention is a multicopter having a plurality of rotors installed radially to a frame, wherein at least one of the plurality of rotors is provided with a cylindrical duct surrounding and enclosing the rotor; and the duct is formed in a shape making an air flow from an air intake side to an air outlet side of the rotor imbalanced in a circumferential direction of the duct.

It is also preferable that the duct is formed such that its length from a rotational plane position of the rotor inside the duct to an air intake end or/and an air outlet end of the duct differs depending on a position in a circumferential direction of the duct.

It is also preferable that the duct is formed such that its length from the rotational plane position of the rotor inside the duct to its air outlet end differs depending on a position in a circumferential direction of the duct; and a portion having the longest duct length to the air outlet end and a portion having the shortest duct length to the air outlet end are positioned in positions opposite to each other in a circumferential direction of the duct.

The duct also may be configured such that a distance between the inner periphery of the duct and the rotating locus of a wing tip of the rotor inside the duct differs depending on a position in a circumferential direction of the duct.

It is also preferable that the multicopter further comprises a control device; the duct is formed in a substantially cylindrical shape; and the duct is turnable in a circumferential direction around its radial centerline as a rotational center and the control device is capable of controlling turn of the duct in a circumferential direction.

Also, a configuration may be such that the duct has a dual cylindrical structure in which an inner cylindrical duct and an outer cylindrical duct, both of which have a substantially cylindrical shape, are placed concentrically; either one of the inner cylindrical duct and the outer cylindrical duct is turnable in a circumferential direction around its radial center line as a rotational center; and the control device is capable of controlling turn of the inner cylindrical duct or the outer cylindrical duct in a circumferential direction.

Also, a configuration may be such that the duct has a dual cylindrical structure in which an inner cylindrical duct and an outer cylindrical duct, both of which have a substantially cylindrical shape, are placed concentrically; the inner cylindrical duct and the outer cylindrical duct are turnable independently of each other in a circumferential direction around their radial center line as a rotational center; and the control device is capable of controlling turn of the inner cylindrical duct and the outer cylindrical duct in a circumferential direction.

Also, a configuration may be such that the rotor provided with the duct is a tiltable rotor in which an angle of its rotational plane can be tilted relatively to the frame; and the duct tilts along with the tiltable rotor.

Also, a configuration may be such that the duct is formed such that a wing-shaped portion extending to a direction of air outlet of the tiltable rotor is formed only in part across its circumference; the wing-shaped portion is formed in a position to define the top surface of the duct when an air intake opening of the duct has been tilted along a heading direction; and the wing-shaped portion generates lift of the multicopter airframe when the multicopter is flying toward its heading direction with an air intake opening of the duct tilted along the heading direction.

Advantageous Effects of Invention

As described above, according to a multicopter pertaining to the present invention, it is possible to prevent rotors from going into a vortex ring state and it would become possible to control lift and thrust generated by the rotors efficiently and elaborately.

DESCRIPTION OF EMBODIMENTS

In the following, embodiments of the present invention will be described with the drawings.

First Embodiment

Figure 1:
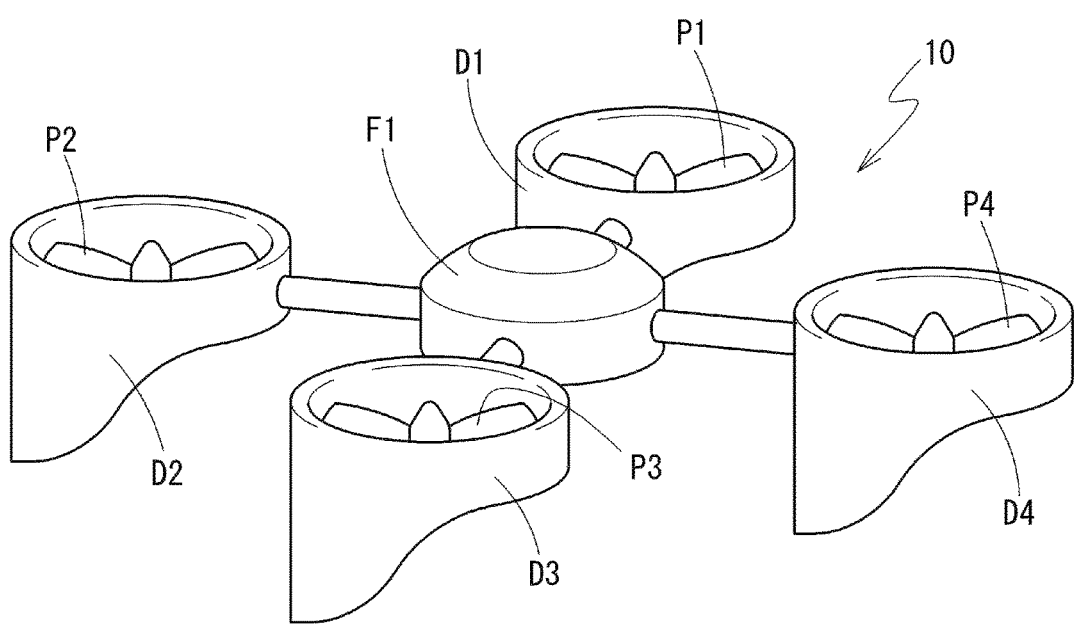
FIG. 1 is an external perspective view depicting a first embodiment of a multicopter of the present invention.

FIG. 1 is an external perspective view depicting a first embodiment of a multicopter of the present invention. The multicopter 10 depicted in FIG. 1 includes a frame F1 which is a housing accommodating a control device, a battery, etc., a plurality of rotors P1, P2, P3, and P4 installed radially to the frame F1, and substantially cylindrical ducts D1, D2, D3, and D4 which surround and enclose the rotors P1 to P4. The length of each duct D1 to D4 from its air intake end to its air outlet end (the length of a duct in this direction may also be referred to as "duct length" hereinafter) differs depending on a position in its circumferential direction. All the ducts D1 to D4 are formed in an identical shape.

Figure 2:
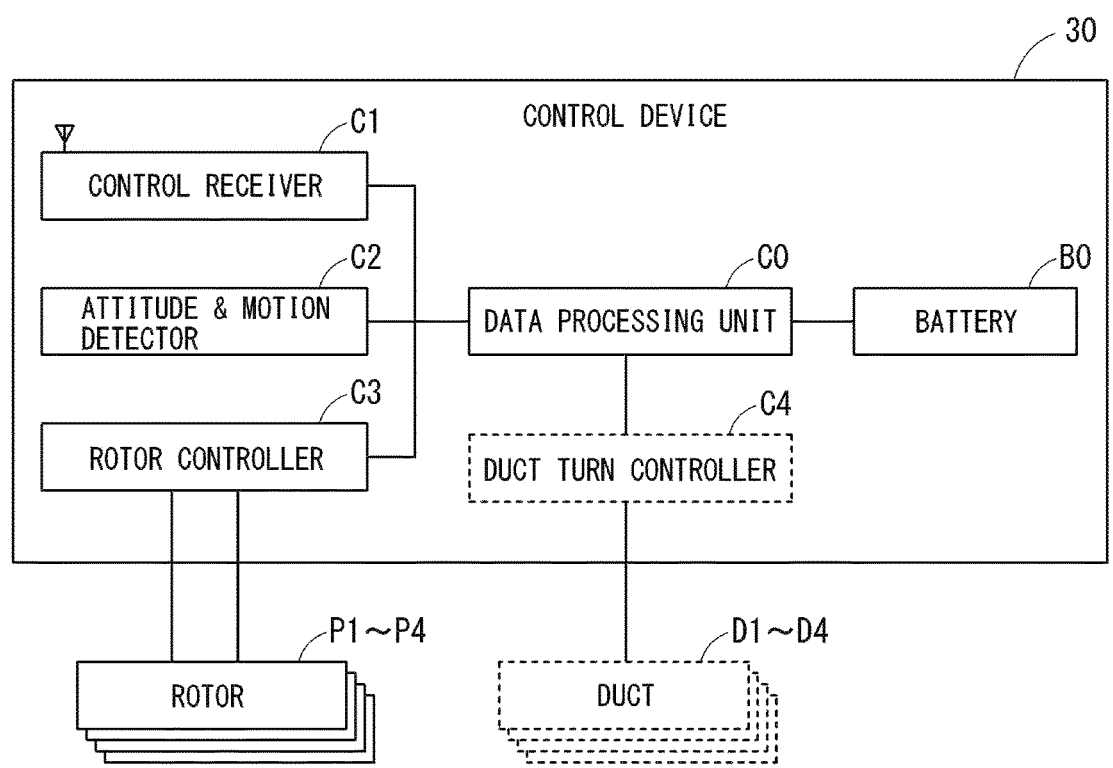
FIG. 2 is a block diagram depicting a functional configuration of a control device of the multicopter in FIG. 1.

FIG. 2 is a block diagram depicting a functional configuration of a control device 30 included in the multicopter 10 in FIG. 1. The control device 30 in the present embodiment is placed inside the frame F1. The control device 30 includes a control receiver C1 which accepts a flight control command from the manipulator of the multicopter 10, an attitude and motion detector C2 which acquires the multicopter's positional information including a latitude, longitude, and altitude during a flight and a heading azimuth in addition to a tilt and turn of the airframe, a rotor controller C3 which adjusts the rotating speed of the rotors P1 to P4, a data processing unit C0 which manages cooperation among these modules in an integrated fashion, and a battery B0 which is a source supplying power. In a case where the ducts D1 to D4 are arranged to be turnable in a circumferential direction (as in a first modification to be described later), the control device 30 further includes a duct turn controller C4 which controls the rotation of the ducts D1 to D4. The data processing unit C0 is interconnected with these control receiver C1, attitude and motion detector C2, rotor controller C3, and duct turn controller C4 through signal lines. Although the battery B0 is connected to only the data processing unit C0 as depicted in FIG. 2, power of the battery B0 is also supplied to the other modules C1 to C4.

When the control receiver C1 of the multicopter 10 receives a command to ascend, the data processing unit C0 increases the rotating speed of the rotors P1 to P4 via the rotor controller C3. When doing so, the data processing unit C0 (and the rotor controller C3) adjusts the rotating speed of the rotors P1 to P4 based on information acquired by the attitude and motion detector C2 and performs control so that the airframe will ascend vertically without tilting the airframe. As for how to control the airframe by the data processing unit C0 using information acquired by the attitude and motion detector C2 in this way, a publicly known flight control algorithm which is used for this kind of multicopter can be used.

Because the duct length of each of the ducts D1 to D4 differs depending on a position in its circumferential direction as described above, an air flow from the air intake side to the air outlet side of each of the rotors P1 to P4 does not become uniform across its entire circumference and an imbalanced air flow arises as a whole. An "imbalanced air flow" in the present invention means that an air flow generated by a rotor is not uniform across its entire circumference and includes a portion of a differing air flow.

Figure 15A:
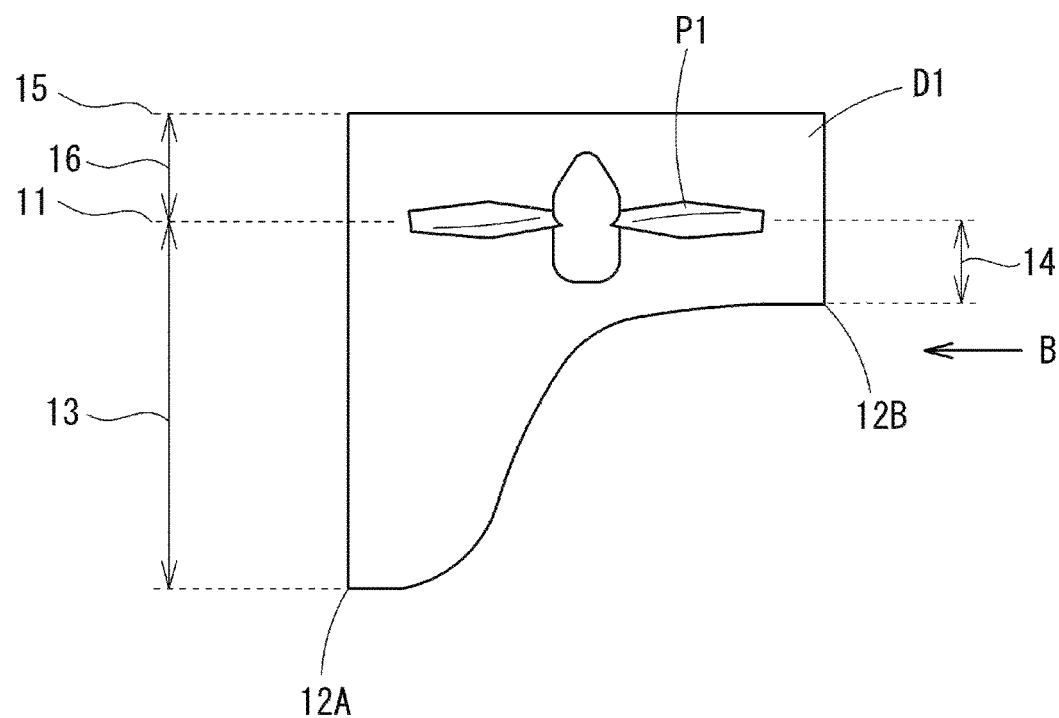
FIG. 15 are a side view (a) of the duct in FIG. 1 and a side view (b) of the duct in FIG. 15(a) when viewed from a direction of arrow B.
Figure 15B:
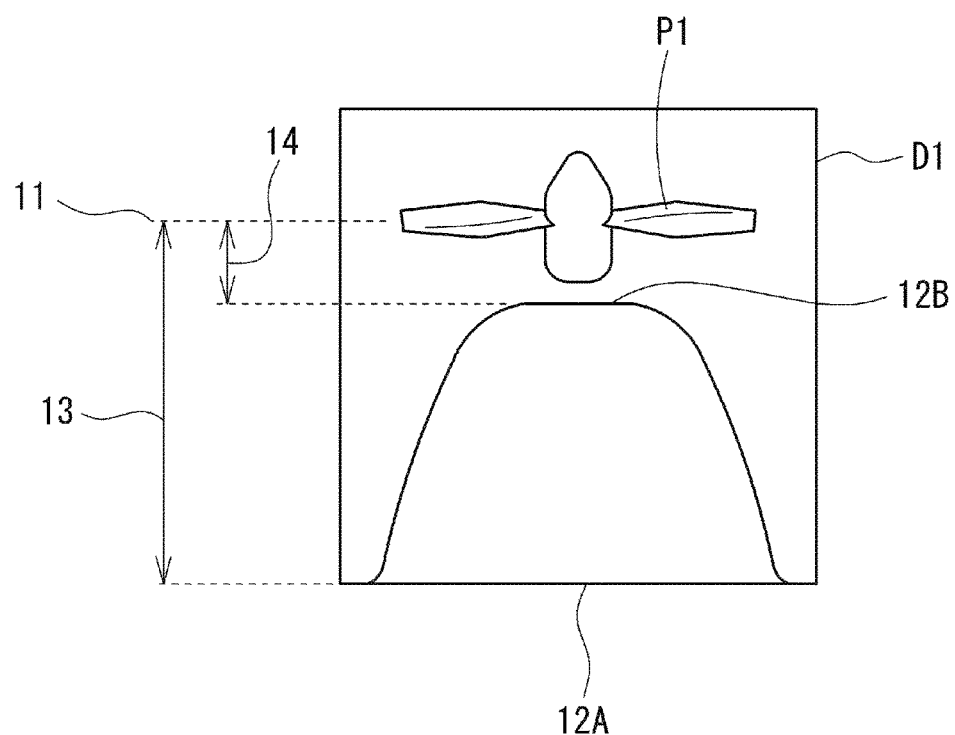

FIG. 15(a) is a side view of a duct D1 in FIG. 1 and FIG. 15(b) is a side view of the duct in FIG. 15(a) when viewed from a direction of arrow B. The duct length of the duct D1 is as depicted in FIG. 15(a); as for the duct length from a rotational plane position 11 of the rotor P1 of the duct D1 to the air outlet end, the duct D1 is formed such that the duct length 13 (left in the view) to an air outlet end position 12A is longer than the duct length 14 (right in the view) to an air outlet end position 12B which is opposite in a circumferential direction.

As depicted in FIG. 15(b), the duct D1 is formed such that the duct length from the rotational plane position 11 of the rotor P1 to the air outlet end becomes shorter gradually from the air outlet end position 12A to the air outlet end position 12B.

Also, as depicted in FIGS. 15(a) and 15(b), the duct D1 is formed such that the duct length 16 from the rotational plane position 11 of the rotor P1 to an air intake end position 15 is equal across its entire circumference.

As described above, the duct length of the duct D1 depicted in FIG. 1 to the air outlet end differs depending on a position in its circumferential direction. That is, for the duct 1, its effect of rectifying an air flow generated by the rotor P1 differs depending on a position in its circumferential direction. Hence, a condition to produce a vortex ring state is not constant across the entire circumference of the rotor P1 and the duct D1; this leads to preventing the rotor P1 from going into a vortex ring state and makes it possible to mitigate its influence.

In the multicopter 10, the respective rotors P1 to P4 are provided with the ducts D1 to D4 respectively, and therefore, an air flow generated within a plane perpendicular to a direction of thrust of the rotors P1 to P4 is rectified by the ducts D1 to D4 and it is enabled to generate lift efficiently. More specifically, it is enabled to obtain thrust, as a measured value, that is 1.5 times or more as much as thrust obtained in a case where the rotors are not provided with the ducts D1 to D4.

Generally, a duct has a merit in which, by rectifying an air flow generated by a rotor to flow toward a desired direction, a vortex flow taking place around the tip of the rotor is reduced and it is possible to obtain lift and thrust at high efficiency as well as prevent generation of a vortex ring state. However, as in a conventional tilt rotorcraft, in a case where the opening of a duct is directed toward a horizontal direction and the rotor is used to generate thrust in the horizontal direction, there is a problem in which the drag of the duct increases in proportion to moving speed and cancels out the thrust which has been generated efficiently. That is, in a case where moving at high speed is carried out with the duct opening directed toward a direction of movement, its structure may become a demerit. In contrast, like the multicopter 10 depicted in FIG. 1, in the airframe in which all the openings of the ducts D1 to D4 are open along a vertical direction and propulsive force derived from the rotors is mainly used as lift, an adverse effect of the ducts on horizontal movement is small.

(First Modification of Duct)

Figure 16:
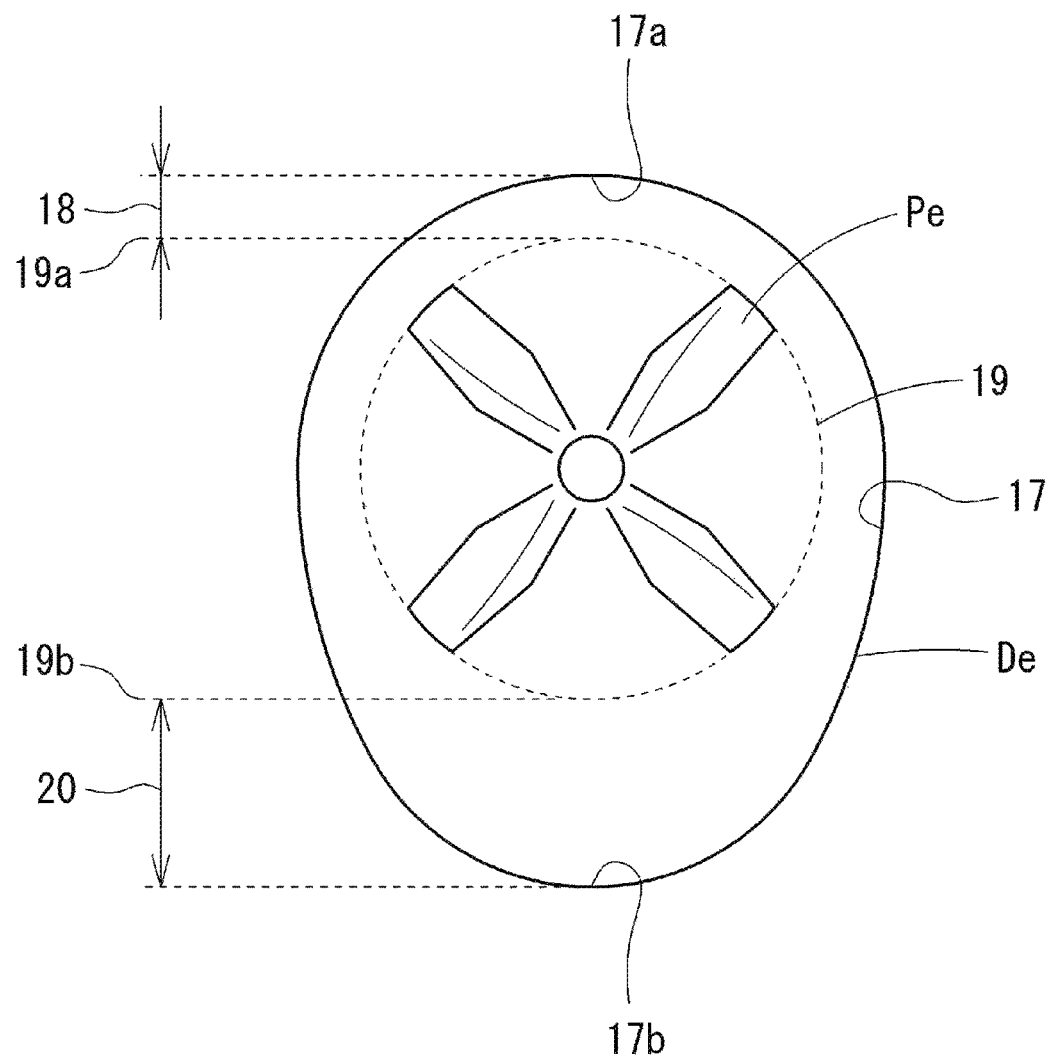
FIG. 16 is a plan view depicting a first modification of a duct in the present invention.

FIG. 16 is a plan view depicting a first modification of a duct which is used in the multicopter 10. A duct De depicted in FIG. 16 is formed such that a distance from a wing tip locus 19 which is a rotating locus of the wing tip of a rotor Pe to the inner periphery of the duct De differs depending on a position in a circumferential direction. The duct De is formed such that a distance 18 from the inner periphery 17a of the duct De at the top in the view of FIG. 16 to a wing tip locus 19a just proximal to the duct is smaller than a distance 20 from the inner periphery 17b of the duct De at the bottom in the view of FIG. 16 on the opposite side in a circumferential direction to a wing tip locus 19b just proximal to the duct. A distance from the rotational plane position of the rotor Pe to the air intake end of the duct De and a distance from the same position to the air outlet end are of the same duct length across the duct's entire circumference, which is, however, not depicted.

Because the distance from the inner periphery 17 of the duct De to the wing tip locus 19 of the rotor Pe differs depending on a position in a circumferential direction as depicted in FIG. 16, for the duct De, its effect of rectifying an air flow generated by the rotor Pe differs depending on a position in its circumferential direction. Hence, an air flow from the air intake side to the air outlet side of the rotor Pe does not become uniform across its entire circumference and an imbalanced air flow arises as a whole. In addition, a condition to produce a vortex ring state is not constant across the entire circumference of the rotor Pe and the duct De; this leads to preventing the rotor Pe from going into a vortex ring state and makes it possible to mitigate its influence.

Although the multicopter 10 of the present embodiment is equipped with four rotors (rotors P1 to P4), the number of rotors of the multicopter 10 is not limited to four and an arbitrary number of rotors is possible. Also, the setup of the rotors can be changed to various placements, provided that the rotors are installed radially.

In addition, although the ducts D1 to D4 are formed in a substantially cylindrical shape in the present embodiment, the shape of the ducts of the present invention is not limited to a cylindrical shape and a non-cylindrical shape such as a rectangular tube shape is also possible.

In the multicopter of the present invention, how much variation in the duct length in a circumferential direction of the duct and how much variation in the distance from the wing tip locus of the rotor to the inner periphery of the duct can be set to an arbitrary quantity depending on an effect to be obtained and restrictions in design.

In addition, although all ducts (ducts D1 to D4) are formed such that the duct length differs depending on a position in its circumferential direction in the present embodiment, a duct for at least one rotor may be thus formed in such a shape in the multicopter of the present invention. Other rotors may be provided with a duct in which, for example, the duct length is equal across the entire circumference and the distance between the wing tip locus of the rotor and the inner periphery of the duct is constant across the entire circumference or may not be provided with a duct.

(Second Modification of Duct)

Figure 3:
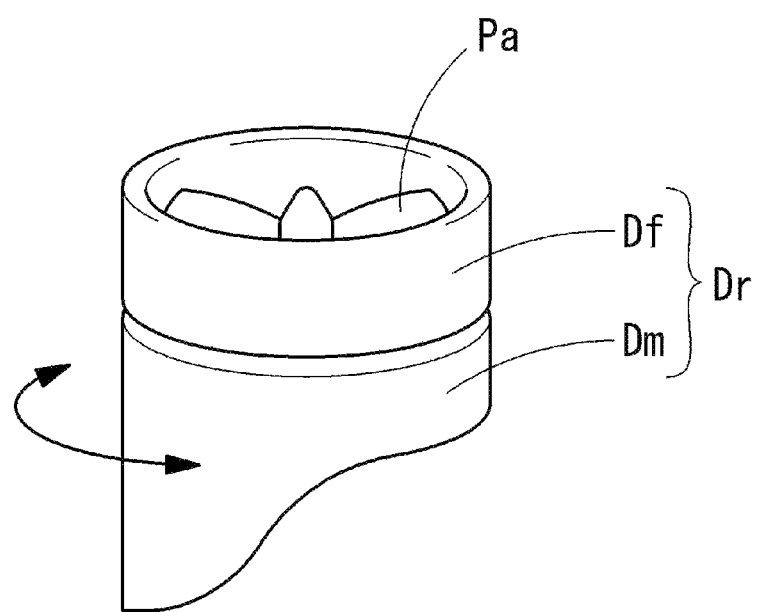
FIG. 3 is an external perspective view depicting a second modification of a duct in the present invention.

FIG. 3 is an external perspective view depicting a second modification of a duct which is used in the multicopter 10. A duct Dr in FIG. 3 is a substantially cylindrical duct and its length from the rotational plane position of a rotor Pa to the air outlet end differs depending on a position in its circumferential direction. Moreover, the duct Dr is comprised of two parts: a duct half Df from the rotational plane position of the rotor Pa to the air intake end; and a duct half Dm from the rotational plane position of the rotor Pa to the air outlet end. The duct half Dm is configured as a turning duct allowed to turn in a circumferential direction around its radial center line as a rotational center. Additionally, the multicopter 10 is equipped with a mechanism of turning the duct half Dm and a duct turn controller C4 which controls turn of the duct half. The duct half Df is fixed to the frame F1 as a non-turnable duct. The duct half Df is formed in a cylindrical shape with equal duct length across its entire circumference.

As the mechanism of turning the duct half Dm, diverse mechanisms which are publicly known can be used, for example, including: a configuration in which a servo motor, not depicted, which is manipulated by the duct turn controller C4 is installed in the airframe and pinions of the servomotor are directly engaged with gears provided on the inner periphery or outer periphery of the duct half Dm; a configuration in which the drive force of the servo motor is transferred to the duct half Dm via another force transmission member; and, alternatively, for example, like an autofocus mechanism of a camera, a configuration in which an ultrasonic motor having a ring-like shape, not depicted, which is manipulated by the duct turn controller C4 is installed in the airframe and the rotor of the ultrasonic motor is connected to the duct half Dm.

The duct half Dm depicted in FIG. 3 is formed in substantially the same shape as that of the corresponding part of the ducts D1 to D4 which are depicted in FIG. 1 from the rotational plane position of the rotors P1 to P4 to the air outlet end. That is, a portion having the longest duct length to the air outlet end of the duct and a portion having the shortest duct length to the air outlet end are positioned 180 degrees apart from each other in a circumferential direction, as depicted in FIGS. 15(a) and 15(b). The duct half Dm depicted in FIG. 3 can be turned in a circumferential direction by the duct turn controller C4 in the control device 30 and can be stopped in an arbitrary position.

The shape of the duct half Dm is not limited to the shape of the present modification. The duct half Dm may have a shape that fulfills the following condition: an air flow from the air intake side to the air outlet side of the rotor Pa does not become uniform across its entire circumference and an imbalanced air flow arises as a whole.

By providing the duct half Dm that is turnable in a circumferential direction, it becomes possible to dynamically change portions where the effect of rectifying the air flow generated by the rotor Pa differs. This enables optimal control to be performed depending on circumstances to make it hard that a vortex takes place around the wing tip of the rotor Pa and it becomes possible to further prevent generation of a vortex ring state.

As described above, the duct Dr of the present modification makes the air flow generated by the rotor Pa imbalanced in a circumferential direction. This means that propulsive force generated by the rotor Pa acts not only in a front-back direction but also partially acts in a planar direction of the rotational plane of the rotor Pa. That is, by controlling a turn angle and positioning of the duct half Dm, it is possible to propel the airframe in the above planar direction, not only in the front-back direction of the rotor Pa. In common multicopters, the airframe is propelled in an arbitrary direction by appropriately adjusting the rotating speed of a plurality of rotors and this presupposes tilting the airframe. In comparison with movement by thus tilting the airframe, more elaborate control can be performed in a case where the direction of propulsive force is controlled by turn of the duct half Dm. More specifically, the shape of the duct Dr placed such that its opening is open along a vertical direction is not the shape allowing rectified air to flow, from above the rotor Pa, only downward vertically, but the shape is arranged to produce slight thrust also in a horizontal direction. In the present modification, because the duct half Dm is configured to be turnable in a circumferential direction, it is enabled to perform elaborate positional control of the airframe in a horizontal direction by turning the duct Dr in a circumferential direction without tilting the entire airframe of the multicopter 10. The duct half Dm and the duct half Df of the duct Dr can also be interchanged in vertical placement.

Given that the structure of the duct Dr is applied to each of the ducts D1 to D4, a relation between positional control and attitude control of the multicopter 10 is as follows. The data processing unit C0 turns the ducts D1 to D4 only by a predetermined angle in a circumferential direction via the duct turn controller C4. Because the ducts D1 to D4 have the shape in which the duct length to the air outlet end differs depending on a position in its circumferential direction, some of the air flow generated by the rotors P1 to P4 also acts as horizontal thrust.

When the multicopter 10 is to ascend or descend, the data processing unit C0 which has received a flight control signal of "ascend" or "descend" from the control receiver C1 causes the airframe to ascend or descend vertically, while keeping the airframe attitude horizontal, based on information from the attitude and motion detector C2. When doing so, the data processing unit C0 appropriately turns the ducts D1 to D4 formed to be turnable while controlling the rotating speed of the plurality of the rotors P1 to P4, thereby enabling it to maintain the airframe in a horizontal position without tilting the airframe.

In addition, when the multicopter 10 is to move horizontally, the data processing unit C0 decides whether the multicopter should move at high speed by tilting the airframe or move elaborately by turning the ducts D1 to D4 according to a move distance and a moving speed specified by a command. That is, for a command by which the multicopter is anticipated to move over a large distance at a high moving speed, the rotor controller C3 controls the rotating speed of each of the rotors P1 to P4, thereby moving the multicopter rapidly while tilting the airframe. On the other hand, for a command by which the multicopter is anticipated to move over a small distance at a low moving speed, the duct turn controller C4 is directed to turn the ducts D1 to D4. By determining an appropriate turn position of the ducts D1 ducts D1 to D4, the multicopter is moved elaborately in a horizontal direction. The above two types of moving methods can be combined and executed at the same time.

(Third Modification of Duct)

Figure 4A:
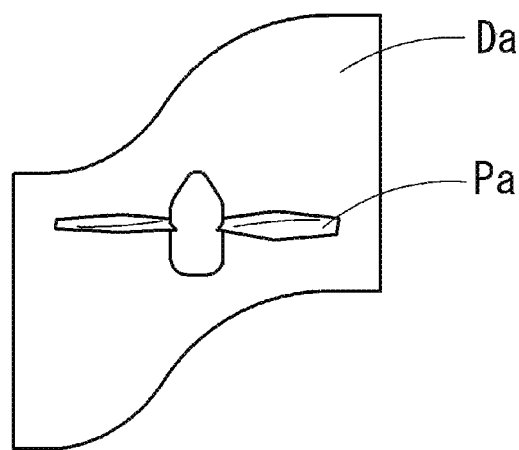
FIG. 4 are a longitudinal cross-sectional view (a) and a plan view (b) depicting a third modification of a duct in the present invention.

FIGS. 4(a) and (b) area longitudinal cross-sectional view (a) and a plan view (b) of a duct Da which is a third modification of a duct which is used in the multicopter 10.

The duct Da is formed such that the duct length from the rotational plane position of the rotor Pa to the air outlet end differs depending on a position in its circumferential direction, as is the case for the ducts D1 to D4 depicted in FIG. 1. The duct Da is further formed such that the duct length from the rotational plane position of the rotor Pa to the air intake end also differs depending on a position in its circumferential direction. The duct Da has a shape such that its upper part and lower part, as depicted in FIG. 4(a), are inverted vertically, when turned 180 degrees in its circumferential direction. The duct Da is formed such that its length from the air intake end to the air outlet end in a vertical direction is equal in any position in its circumferential direction.

In comparison with the ducts in FIG. 1 and FIG. 3, the duct Da is configured in a shape in which possibility of generation of a vortex ring state is further reduced and more horizontal thrust can be produced. In the duct Da, its upper part, as depicted in FIG. 4(a), having a long duct length and its lower part, as depicted in FIG. 4(a), having a short duct length are positioned in an identical position in its circumferential direction. In a position at 180 degrees apart in a circumferential direction, the upper part having a short duct length and the lower part having a long duct length are positioned in an identical position.

In addition, the shape of the duct Da may be a shape in which the ducts D1 to D4 in FIG. 1 are vertically inverted. That is, the duct Da is formed such that the duct length from the rotational plane position of the rotor Pa to the air intake end of the duct Da differs depending on a position in its circumferential direction, and inversely, the duct length from the rotational plane position of the rotor Pa to the air outlet end of the duct Da may be equal across the entire circumference.

In addition, the shape of a duct in the present invention is not limited to each of the shapes described previously and any combination of them is possible. For example, when both the air intake side and the air outlet side of a rotor are provided with a duct whose length differs depending on a position in a circumferential direction, which is not depicted specifically, the duct may be configured in a shape in which a portion having a long duct length in the air intake side and a portion having a long duct length in the air outlet side are positioned in an identical position in a circumferential direction and, in a position at 180 degrees apart from there, a portion having a short duct length in the air intake side and a portion having a short duct length in the air outlet side are positioned. In this case, especially when the multicopter moves horizontally, a difference in the drag against a direction of movement will change largely by turning the duct; that is, it becomes possible to change the amount of transitional lift (lift produced by increase in the amount of air flow passing through the rotor).

Figure 4B:
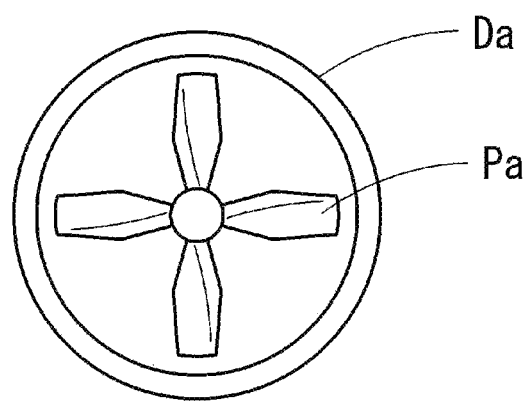

Additionally, the duct Da in FIG. 4 may be configured to be turnable in a circumferential direction, like the duct Dr of Modification 2. In this case, the duct Da is divided into two ducts like a duct half in the air intake side from the rotational plane position the rotor Pa and a duct half in the air outlet side from the same rotational plane position; either one of them may be configured to be turnable or both the ducts may be configured to be turnable dependently.

Figure 5:
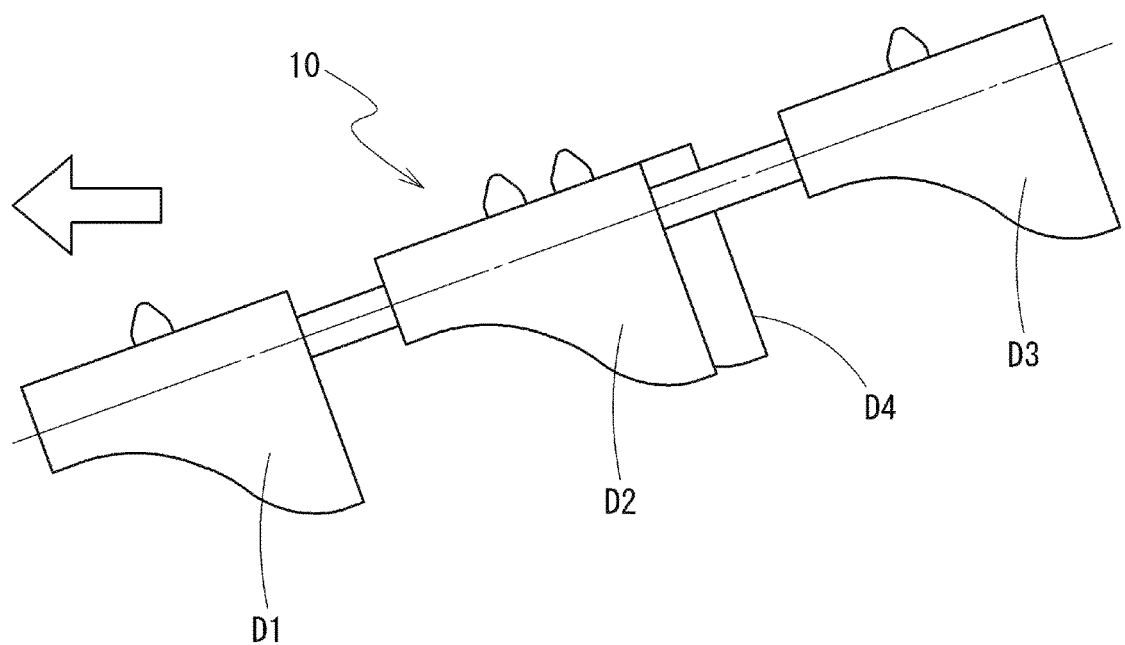
FIG. 5 is a side view depicting a flying state of the multicopter in FIG. 1.

FIG. 5 is an explanatory diagram of the flying multicopter 10 when viewed from its one side. The duct (duct Dr) that is turnable in a circumferential direction is used as the ducts D1 to D4 of the multicopter 10 in FIG. 5. An arrow in FIG. 5 indicates a direction of movement of the multicopter 10. The multicopter 10 in FIG. 5 moves forward to the left in the diagram. As depicted in FIG. 5, for all the ducts D1 to D4 of the multicopter 10, their short duct length portions are directed toward the direction of movement. When the ducts D1 to D4 are positioned in this way, since wind from the direction of movement flows backward and downward along the ducts D1 to D4, the respective ducts D1 to D4 act in the same way as when the flap of an aircraft is down. In addition to increasing lift, an increase in transitional lift can be expected when in movement at high speed to some extent and flying with more reduced power consumption becomes possible.

Contrary to the structure depicted in FIG. 5, even when long duct length portions of the ducts D1 to D4 are positioned, directed toward the direction of movement, (which is not depicted), an effect corresponding to flap-down can be expected, but to a smaller degree than with the structure depicted in FIG. 5. However, because transitional lift becomes hard to obtain, the latter is inefficient as compared with the structure depicted in FIG. 5. However, if the multicopter is moving at low speed, an effect of blocking a headwind enables it to reduce variation in lift due to change in the headwind intensity and stable movement becomes possible.

Moreover, as the ducts D1 to D4 are turned, when their intermediate duct length portions are directed toward the direction of movement, the profile areas of the ducts D1 to D4 against the direction of movement become minimum, and therefore, the drag generated by the outsides of the ducts becomes smallest. It is also possible for the multicopter to fly with the ducts D1 to D4 positioned in this way, according to a balance between lift and moving speed.

Figure 6:
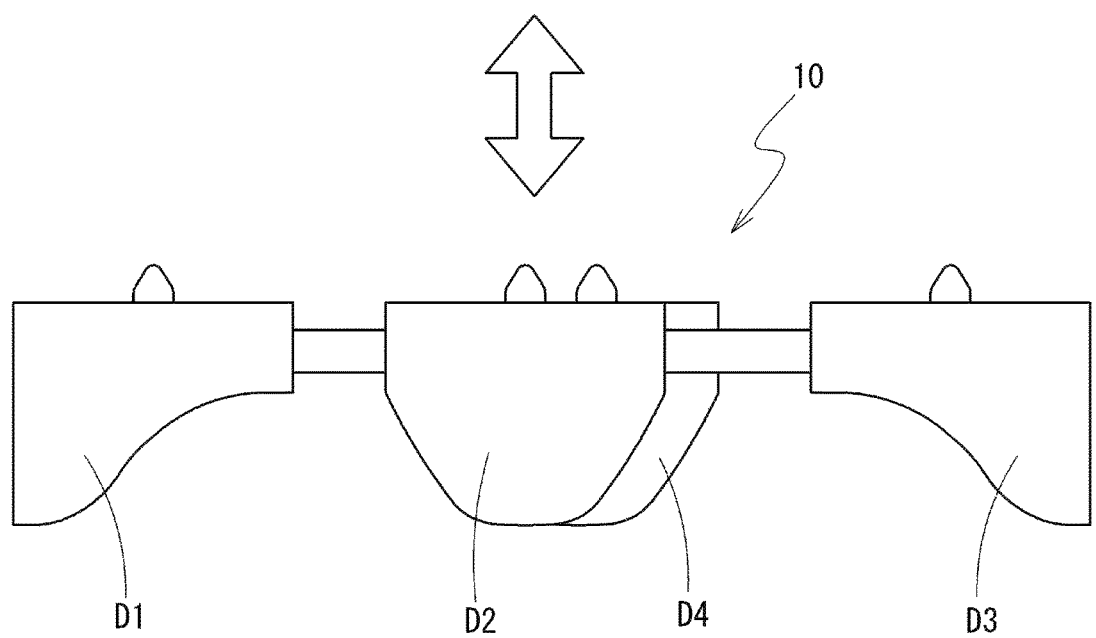
FIG. 6 is a side view depicting a state in which all the long portions of the ducts of the multicopter in FIG. 1 are directed outward by turning the ducts.

FIG. 6 is a side view depicting a state in which all the long duct length portions of the ducts D1 to D4 of the multicopter 10 in FIG. 5 are directed outward with respect to the center of the frame F1. As depicted in FIG. 6, when the ducts D1 to D4 are turned and positioned with all the long duct length portions being directed outward, the multicopter 10 does not move in a horizontal direction. For instance, when the multicopter 10 is to move up and down in a vertical direction (as indicated by arrow), it is possible to stabilize the attitude, minimizing an impact of wind from a horizontal direction.

In addition, when the ducts D1 to D4 are positioned at an angle as depicted in FIG. 6, thrust slightly goes away toward a direction in which the duct length becomes shorter. Hence, even under some disturbance, it is possible to maintain the multicopter 10 in the current position by turning the ducts D1 to D4 and adjusting horizontal thrust.

(Fourth Modification of Duct)

Figure 7A:
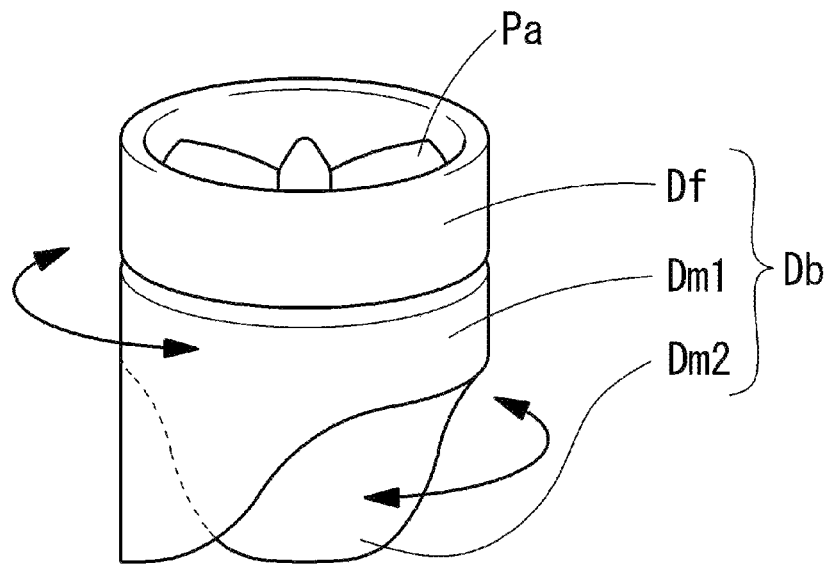
FIG. 7 are an external perspective view (a) and a plan view (b) depicting a fourth modification of a duct in the present invention.
Figure 7B:
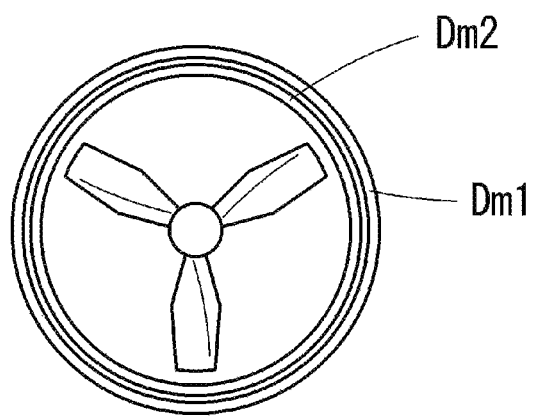

FIG. 7 is a diagram depicting a fourth modification of a duct in the present invention. A duct Db pertaining to the fourth modification is an example in which the duct is configured as a dual cylindrical structure. FIG. 7(a) is an external perspective view of the duct Db and FIG. 7(b) is a plan view of the duct in FIG. 7(a). The duct Db depicted in FIGS. 7(a) and 7(b) is configured such that a turnable part of the duct Db has dual ducts which are placed concentrically. The turnable part of the duct Db is comprised of two substantially cylindrical ducts: an outer cylindrical duct Dm1 and an inner cylindrical duct Dm1. These outer cylindrical duct Dm1 and inner cylindrical duct Dm2 are configured to be turnable independently of each other in a circumferential direction around their radial centerline as a rotational center. The duct Db is arranged to enable it to appropriately change a proportion of duct length in its circumferential direction by turning the outer cylindrical duct Dm1 and inner cylindrical duct Dm2. The outer cylindrical duct Dm1 and inner cylindrical duct Dm2 are formed in substantially the same shape. In a state in which their long duct length portions completely overlap with each other in the circumferential direction, these cylindrical ducts appear like the turning duct D in FIG. 3.

For example, now, when the inner cylindrical duct Dm2 is turned with the outer cylindrical duct Dm1 standing still, the overlap of the long duct length portions shifts so that the duct will occupy more space. For example, in FIG. 7, the inner cylindrical duct Dm2 is positioned in a state that it has turned by about 90 degrees relative to the outer cylindrical duct Dm1. In this state, the proportion of the long duct length portions of the duct Db in its circumferential direction is larger, as compared with a state in which two ducts (the outer cylindrical duct Dm1 and the inner cylindrical duct Dm2) are positioned to completely overlap with each other. Thus, an adjustment can be made of the effect of lift and transitional lift or the like during movement described previously and more elaborate attitude control becomes possible.

Figure 8:
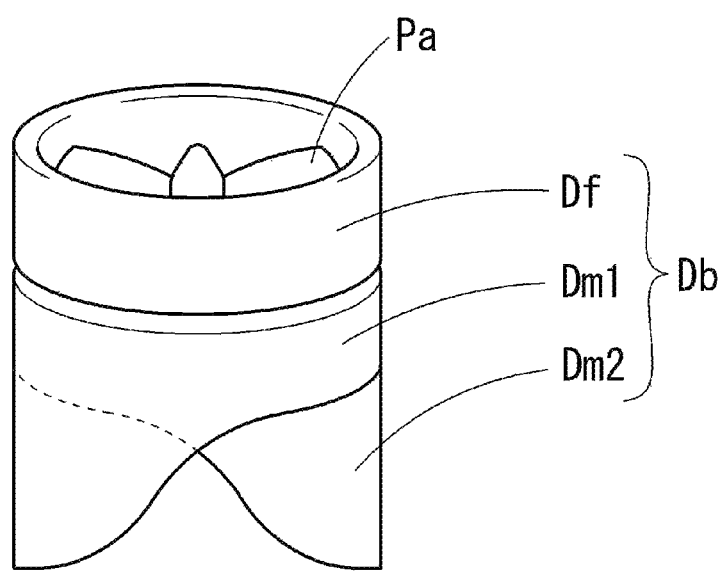
FIG. 8 is an external perspective view depicting a state in which an inner cylindrical duct of the duct in FIG. 7 has turned by about 180 degrees.

FIG. 8 is an external perspective view depicting a state in which the inner cylindrical duct Dm2 of the duct Db in FIG. 7 has been further turned by 90 degrees. That is, the inner cylindrical duct Dm2 is positioned in a position that it has turned by about 180 degrees relative to the outer cylindrical duct Dm1 from the position where the two cylindrical ducts overlap completely. In this state, with respect to horizontal thrust, the duct has the pseudo same effect as the duct with equal duct length across the entire circumference. Although a duct with excessively long duct length may produce a drag during movement in a horizontal direction, an appropriate duct length prevents a direct disturbance air flow from hitting against the rotor and contributes to stabilizing the attitude and increasing lift.

In a case where dual ducts (outer cylindrical duct Dm1 and inner cylindrical duct Dm2) are installed, as in the fourth modification, an arrangement for the ducts to turn may be made to turn both the outer and inner cylindrical ducts Dm1 and DM2 or to turn only either one of them. That is, an arrangement may be made to make it possible to regulate an imbalanced air flow as a whole generated by the rotor to an arbitrary angle in a circumferential direction. As a mechanism of turning the outer and inner cylindrical ducts Dm1 and Dm2 of the duct Db, the same mechanism as for the duct Dr of the second modification can be used.

In a case where the duct is configured as a dual cylindrical structure and the inner and outer cylindrical ducts are allowed to turn independently, the distance from the rotating locus of the wing tip of the rotor to the inner periphery of each duct is constant across the entire circumference. However, the length of each duct from the rotational plane position of the rotor to the air intake end or air outlet end of the duct differs depending on a position in its circumferential direction. Moreover, by configuring these ducts to be turnable, it becomes possible to control horizontal thrust elaborately.

Second Embodiment

Figure 9:
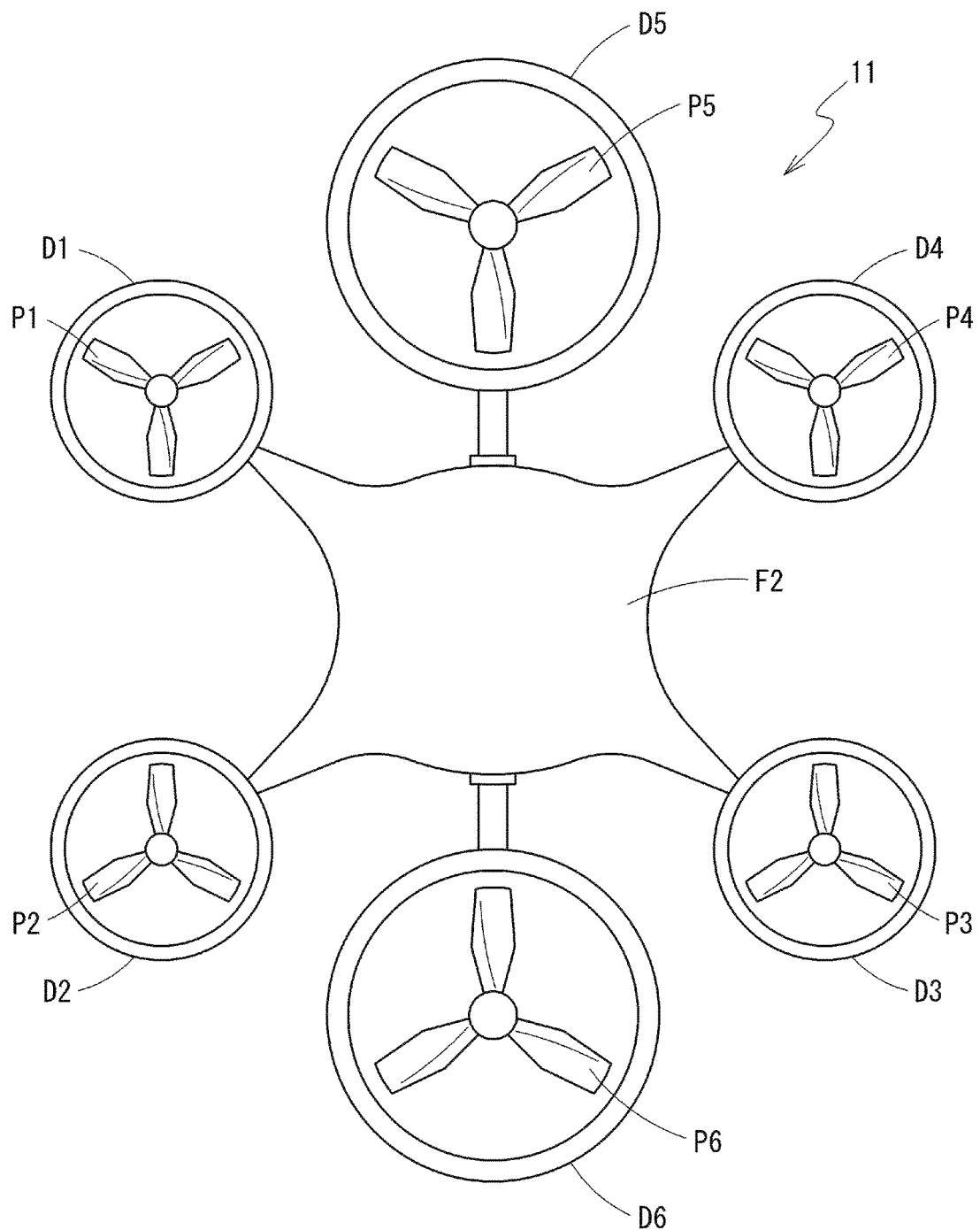
FIG. 9 is a plan view depicting a second embodiment of a multicopter of the present invention.

FIG. 9 is a plan view depicting a second embodiment of a multicopter of the present invention. The multicopter 11 in FIG. 9 has two rotors P5, P6 in addition to four rotors P1 to P4 which are the same as in the foregoing embodiment and is a hexacopter equipped with a total of six rotors. In addition to the rotors P1 to P4 fixed to a frame F2, the multicopter 11 is equipped with tiltable rotors P5, P6 in which an angle of the rotational plane can be tilted relatively to the frame. These rotors P1 to P6 are provided with ducts D1 to D6 surrounding and enclosing them. Ducts D5, D6 of the tiltable rotors P5, P6 tilt along with the tiltable rotors P5, P6.

The multicopter 11 is installed to the frame F2 such that its front-back direction corresponds to a direction perpendicular to a line connecting the tiltable rotors P5, P6 on a horizontal plane and the tiltable rotors P5, P6 can be tilted in the front-back direction. The tiltable rotors P5, P6 are installed in positions symmetric with respect to a centerline of the airframe of the multicopter 11 in the front-back direction, and therefore, the number of tiltable rotors P5, P6 which can be installed can be increased.

Figure 10:
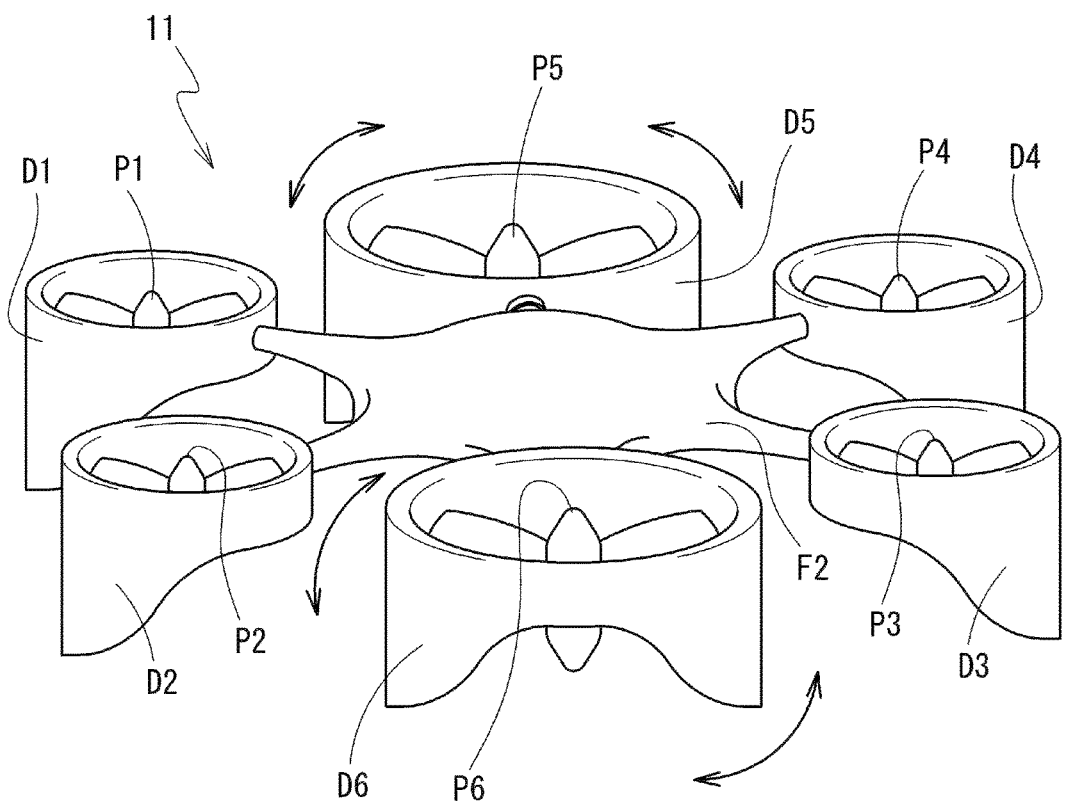
FIG. 10 is an external perspective view of the multicopter in FIG. 9.
Figure 11:
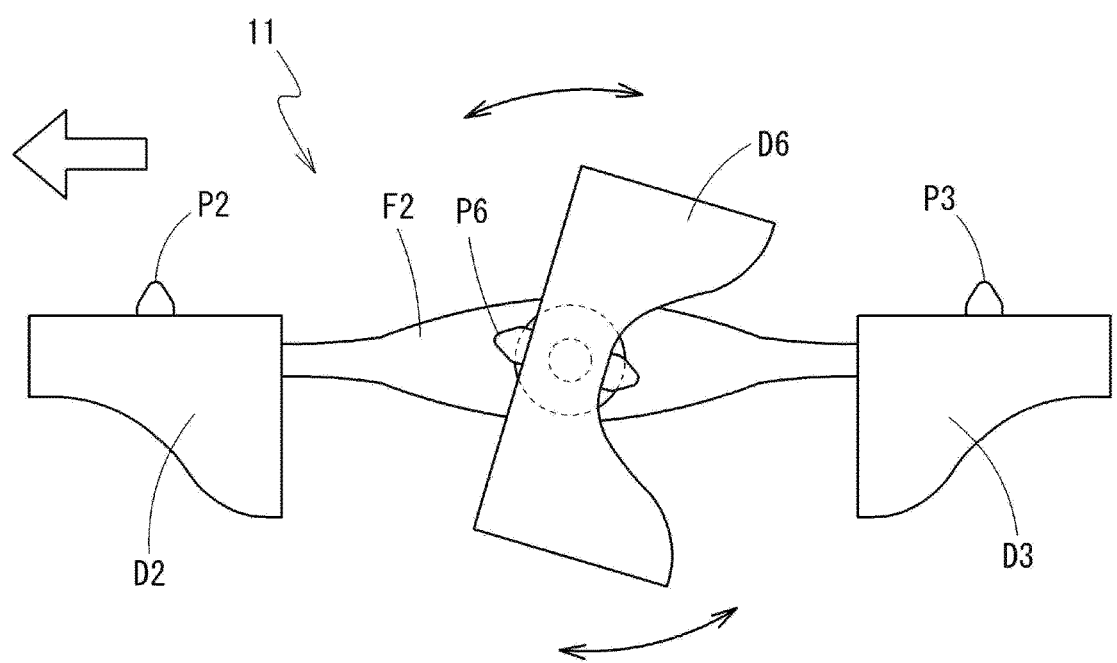
FIG. 11 is a side view depicting a state in which some of rotors of the multicopter 11 are tilted.

FIG. 10 is an external perspective view of the multicopter 11 and FIG. 11 is a side view depicting a state in which the tiltable rotors P5, P6 of the multicopter 11 are tilted. Arrows in FIG. 10 indicate a direction toward which the tiltable rotors P5, P6 of the multicopter 11 can be tilted. FIG. 11 is a side view of the multicopter 11 when viewed from the side of its duct D6 and depicts a state in which the duct D6 (tiltable rotor P6) is tilted to direct its air intake side toward the front (heading) of the multicopter 11.

When the multicopter 11 takes off, all the rotors P1 to P6 face upward, as depicted in FIG. 10, to cause the airframe to ascend with maximum thrust. Then, the tiltable rotors P5, P6 are gradually tilted toward the heading, as depicted in FIG. 11, to change the propulsive force generated by the tiltable rotors P5, P6 from lift to forward thrust. At the same time, the rotors P1 to P4 are controlled to maintain lift and a decrease in lift due to the tilt of the tiltable rotors P5, P6 is compensated by these rotors P1 to P4. For a vertical takeoff and landing craft, tilt of all rotors after taking off changes its lift to horizontal thrust, but a method in the present embodiment provides much higher stability than a method of controlling such a vertical takeoff and landing craft. That is, this is because horizontal thrust can be increased in a state that necessary lift is guaranteed.

Although the tiltable rotors P5, P6 of the multicopter 11 are provided with the ducts D5, D6 respectively, the tiltable rotors P5, P6 may be dispensed with the ducts D5, D6. With the rotors without the ducts D5, D6, it can be avoided that the drag of the ducts increases in proportion of speed when the multicopter moves at high speed with the duct openings directed toward the direction of movement.

Additionally, the number of tiltable rotors is not limited to two and may be one or three. In a case where the multicopter is equipped with one tiltable rotor only, it is preferable that the rotor is installed so that it can be tilted toward the direction of movement, toward the heading of the multicopter or its opposite end.

(Fifth Modification of Duct)

Figure 12:
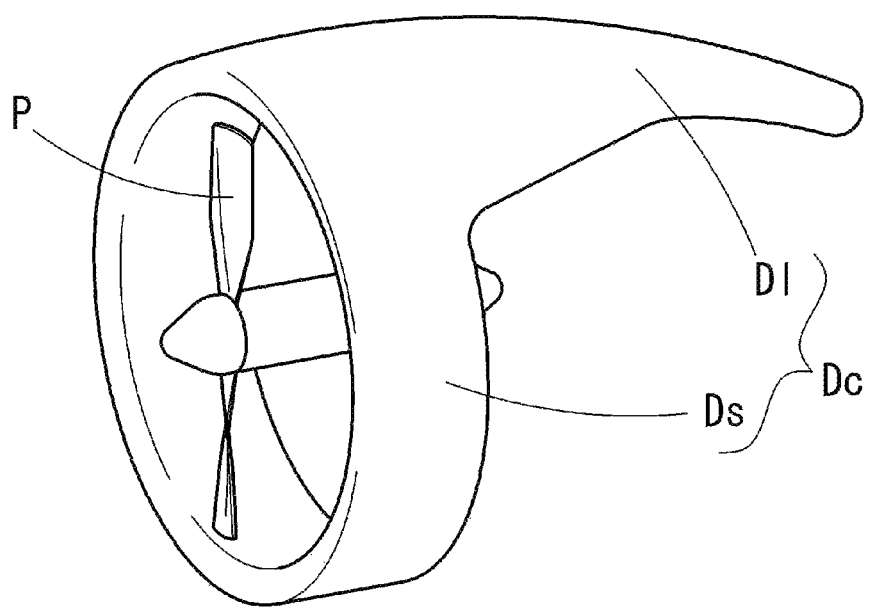
FIG. 12 is an external perspective view depicting a fifth modification of a duct in the present invention.

FIG. 12 is an external perspective view of a duct Dc which is a modification of a duct for a tiltable rotor of the present invention. It is preferable that a tiltable rotor is provided with a duct having a structure in which a short duct length portion Ds fills a large portion of the entire circumference and a wing-shaped portion D1 which extends to the air outlet side is formed only in part, as exemplified with the duct Dc.

Figure 13:
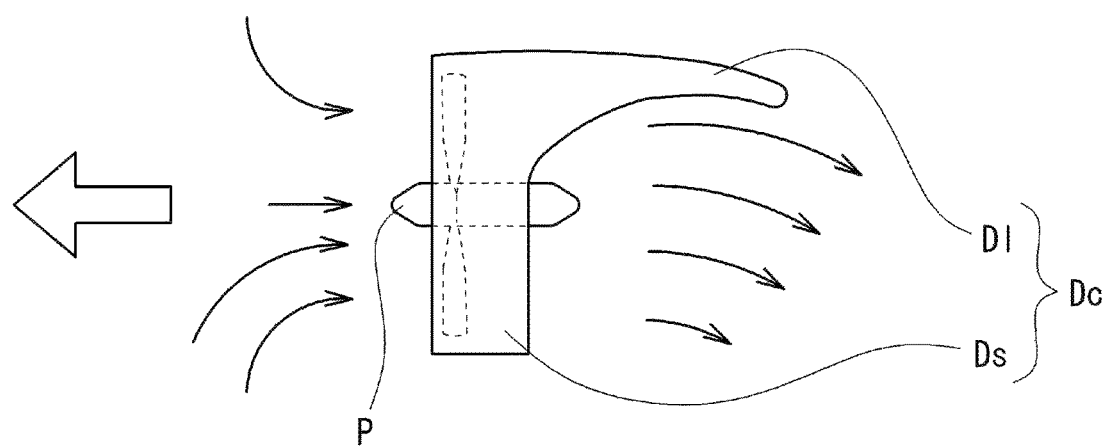
FIG. 13 is a side view to explain an air flow through the duct in FIG. 12.

FIG. 13 is a side view to explain an air flow through a rotor P provided with the duct Dc. As depicted in FIG. 13, when the air intake side of the rotor P is tilted toward the heading, the wing-shaped portion D1 placed in a position to define the top surface of the duct Dc generates lift as with a fixed wing. Increase in the drag of the duct Dc is suppressed and the wing-shaped portion D1 generates lift during high-speed movement; thus, flying with more reduced power consumption becomes possible.

Figure 14:
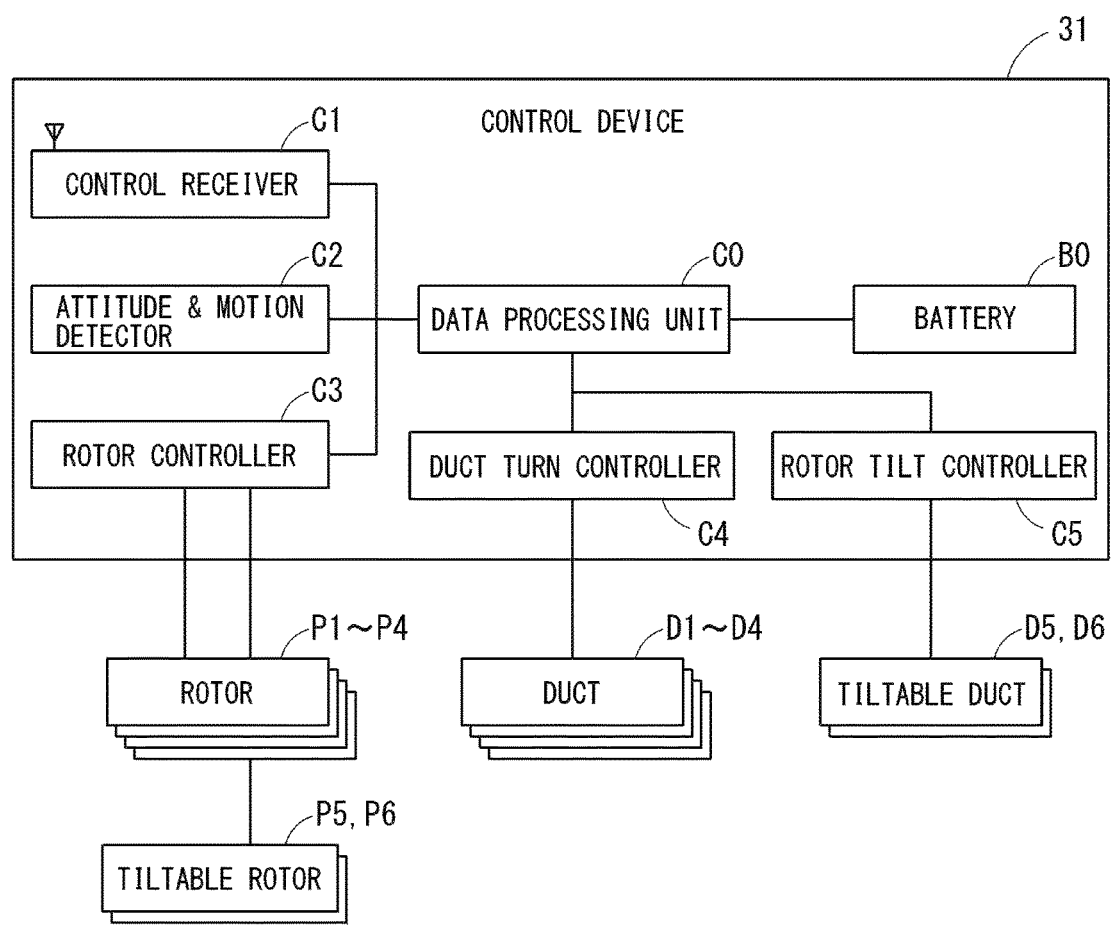
FIG. 14 is a block diagram depicting a functional configuration of a control device of the multicopter in FIG. 9.

FIG. 14 is a block diagram depicting a functional configuration of a control device 31 of the multicopter 11. The control device 31 in the present embodiment is placed inside the frame F2. The control device 31 includes a control receiver C1 which accepts a flight control command from the manipulator of the multicopter 11, an attitude and motion detector C2 which acquires the multicopter's positional information including a latitude, longitude, and altitude during a flight and a heading azimuth, in addition to a tilt and turn of the airframe, a rotor controller C3 which adjusts the rotating speed of the rotors P1 to P6, a duct turn controller C4 which controls turn of the ducts D1 to D4, a rotor tilt controller C5 which controls the tilt angle of the tiltable rotors P5, a data processing unit C0 which manages cooperation among these modules in an integrated fashion, and a battery B0 which is a source supplying power. The data processing unit C0 is interconnected with each module through signal lines. Although the battery B0 is connected to only the data processing unit C0 as depicted in FIG. 14, power of the battery B0 is also supplied to other modules C1 to C5.

When the control receiver C1 of the multicopter 11 receives a command to ascend, the data processing unit C0 increases the rotating speed of the rotors P1 to P6 via the rotor controller C3. When doing so, the data processing unit C0 (and the rotor controller C3) controls the rotating speed of the rotors P1 to P6 based on information acquired by the attitude and motion detector C2 and performs control so that the airframe will ascend vertically without tilting the airframe. As for a way of controlling the airframe by the data processing unit C0 using information acquired by the attitude and motion detector C2, as above, a publicly known flight control algorithm which is used for this kind of multicopter can be used.

While the multicopter 11 ascends and transits to horizontal flying, the rotor tilt controller C5 sets the tilt to 0 and keeps the rotational plane of the tiltable rotors P5, P6 horizontal. When a command to move in a horizontal direction is input from the control receiver C1 to the data processing unit C0, the data processing unit C0 controls the rotors P1 to P4 and the ducts D1 to D4 based on information acquired by the attitude and motion detector C2 and maintains the multicopter at an attitude while keeping its attitude horizontal. At the same time, the data processing unit C0 is tilting the rotors P5, P6 via the rotor tilt controller C5 while directing the airframe heading toward the direction of movement. While being tilted, the lift generated by the tiltable rotors P5, P6 gradually changes to horizontal thrust and this lift is eventually lost. This lost lift is compensated by increasing the rotating speed of the rotors P1 to P4 and the multicopter 11 can be maintained at a given altitude.

When the multicopter 11 is loaded with heavy goods as a payload, or when it takes off a highland or the like where air is rarefied, it may need to run and take off using transitional lift. In this case, action to be taken is as below: tilt the entire airframe without tilting the tiltable rotors P5, P6 and, after increasing the speed in a horizontal direction, tilt the tiltable rotors P5, P6. In such a case where it is impossible to make the airframe ascend sufficiently with only the lift generated by the rotors P1 to P4, the data processing unit C0 can put a restriction on the maximum tilt angle of the tiltable rotors P5, P6 to compensate the lift of the airframe by propulsive force generated by the tiltable rotors P5, P6.

The invention claimed is:

1. A multicopter having a plurality of rotors installed radially to a frame,
    wherein at least one of the plurality of rotors is provided with a cylindrical duct surrounding and enclosing the rotor, the cylindrical duct being turnable in a circumferential direction; and
    the duct is formed in a shape making an air flow from an air intake side to an air outlet side of the rotor imbalanced in a circumferential direction of the duct.

2. The multicopter according to claim 1, wherein the duct is formed such that its length from a rotational plane position of the rotor inside the duct to an air intake end or/and an air outlet end of the duct differs depending on a position in a circumferential direction of the duct.

3. The multicopter according to claim 2,
    wherein the duct is formed such that its length from the rotational plane position of the rotor inside the duct to the air outlet end of the duct differs depending on a position in a circumferential direction of the duct; and
    a portion having the longest duct length to the air outlet end and a portion having the shortest duct length to the air outlet end are positioned in positions opposite to each other in a circumferential direction of the duct.

4. The multicopter according to claim 3,
    wherein the multicopter further comprises a control device;
    the duct is formed in a substantially cylindrical shape; and
    the duct is turnable in a circumferential direction around its radial center line as a rotational center and the control device is capable of controlling turn of the duct in a circumferential direction.

5. The multicopter according to claim 4,
    wherein the duct has a dual cylindrical structure in which an inner cylindrical duct and an outer cylindrical duct, both of which have a substantially cylindrical shape, are placed concentrically;
    either one of the inner cylindrical duct and the outer cylindrical duct is turnable in a circumferential direction around its radial center line as a rotational center; and
    the control device is capable of controlling turn of the inner cylindrical duct or the outer cylindrical duct in a circumferential direction.

6. The multicopter according to claim 4,
    wherein the duct has a dual cylindrical structure in which an inner cylindrical duct and an outer cylindrical duct, both of which have a substantially cylindrical shape, are placed concentrically;
    the inner cylindrical duct and the outer cylindrical duct are turnable independently of each other in a circumferential direction around their radial center line as a rotational center; and
    the control device is capable of controlling turn of the inner cylindrical duct and the outer cylindrical duct in a circumferential direction.

7. The multicopter according to claim 2,
    wherein the multicopter further comprises a control device;
    the duct is formed in a substantially cylindrical shape; and
    the duct is turnable in a circumferential direction around its radial center line as a rotational center and the control device is capable of controlling turn of the duct in a circumferential direction.

8. The multicopter according to claim 7,
    wherein the duct has a dual cylindrical structure in which an inner cylindrical duct and an outer cylindrical duct, both of which have a substantially cylindrical shape, are placed concentrically;
    either one of the inner cylindrical duct and the outer cylindrical duct is turnable in a circumferential direction around its radial center line as a rotational center; and
    the control device is capable of controlling turn of the inner cylindrical duct or the outer cylindrical duct in a circumferential direction.

9. The multicopter according to claim 7,
    wherein the duct has a dual cylindrical structure in which an inner cylindrical duct and an outer cylindrical duct, both of which have a substantially cylindrical shape, are placed concentrically;
    the inner cylindrical duct and the outer cylindrical duct are turnable independently of each other in a circumferential direction around their radial center line as a rotational center; and
    the control device is capable of controlling turn of the inner cylindrical duct and the outer cylindrical duct in a circumferential direction.

10. The multicopter according to claim 1, wherein the duct is formed such that a distance between the inner periphery of the duct and the rotating locus of a wing tip of the rotor inside the duct differs depending on a position in a circumferential direction of the duct.

11. A multicopter having a plurality of rotors installed radially to a frame,
    wherein at least one of the plurality of rotors is provided with a cylindrical duct surrounding and enclosing the rotor;

the rotor provided with the duct is a tiltable rotor in which an angle of its rotational plane can be tilted along with the duct relatively to the frame;

the duct is formed such that a wing-shaped portion extending to a direction of air outlet of the tiltable rotor is formed only in part across its circumference;

the wing-shaped portion is formed in a position to define the top surface of the duct when an air intake opening of the duct has been tilted along a heading direction; and the wing-shaped portion generates lift of the multicopter airframe when the multicopter is flying toward its heading direction with an air intake opening of the duct tilted along the heading direction.

* * * * *